US005083619A

United States Patent [19]

Giardino et al.

[11] Patent Number: 5,083,619

[45] Date of Patent: Jan. 28, 1992

[54] POWERED IMPACT WRENCH

[75] Inventors: David A. Giardino, Utica; William K. Wallace, Barneveld; Joseph R. Groshans, Clinton, all of N.Y.

[73] Assignee: Chicago Pneumatic Tool Company, Utica, N.Y.

[21] Appl. No.: 411,715

[22] Filed: Sep. 25, 1989

[51] Int. Cl.[5] .................... B23B 45/16

[52] U.S. Cl. .................... 173/93; 173/93.5; 173/104; 81/467

[58] Field of Search .................... 173/93, 93.5, 104, 47, 173/48; 81/467, 473

[56] References Cited

U.S. PATENT DOCUMENTS 3,034,623 5/1962 Amtsberg .................... 192/56
3,414,066 12/1968 Wallace .................... 173/93.6
3,428,137 2/1969 Schaedler .................... 173/93.6
3,714,994 2/1973 Zoerner et al. .................... 173/93
3,908,768 9/1975 Hess .................... 173/93

*Primary Examiner*—Timothy V. Eley
*Assistant Examiner*—Willmon Fridie, Jr.
*Attorney, Agent, or Firm*—Charles L. Johnson, Jr.

[57] ABSTRACT

A reversible powered impact wrench is provided wherein improvements are incorporated in the detenting of the reverse direction valve, venting of excessive air pressure within the impact wrench motor housing which may use light weight material due to improved clutch and camming means and wherein an improved one piece anvil-timing shaft is designed to be supported by the impact wrench hammer and rotor.

5 Claims, 4 Drawing Sheets

POWERED IMPACT WRENCH

BACKGROUND OF THE INVENTION

A. Field of the Invention

This invention relates to the art of rotary impact wrenches of a type in which a rotating member is periodically reciprocated into and out of rotary impacting relation with an anvil portion of a torque output shaft.

B. Description of the Prior Art

The evolution of powered impact wrenches includes one example in U.S. Pat. No. 3,428,137 which issued Feb. 18, 1969 for an "Impact Wrench". Some of the aspects of the prior art are the lack of a good pilot arrangement to position the lugs of the dog hammer to the anvil. The use of a spline connection between parts of the anvil does not ensure proper alignment of the hammer dogs and the anvil and causes loading on the bearing supports. Some past problems noted were loosening of the anvil bushing and cam shaft breakage. Also the prior art spline connection of the anvil parts affords little support for the anvil. Extra machining of parts was required by some of the prior art designs which added to the expense of the tool and the time required to make it. When light weight materials were tried in prior art devices the inertia of the moving parts was transmitted to the operator holding the tool.

OBJECT OF THE INVENTION

The object of the invention is to provide an improved power operated impact wrench including a camming arrangement which permits the use of a light weight tool housing without the inertia effects of the working tool having a disturbing vibratory effect on the operator who is holding the tool.

Also, the improved tool includes an improved O-ring detenting arrangement in the reverse direction valve operation and an improved air pressure venting arrangement to maintain relatively constant air pressure within the tool housing.

An improved one piece anvil-timing shaft is provided wherein an anvil shoulder provides support within the dog hammer at one end of the anvil and the other end of the anvil is supported by a recess in the motor rotor.

DESCRIPTION OF PREFERRED EMBODIMENT

Figure 1:
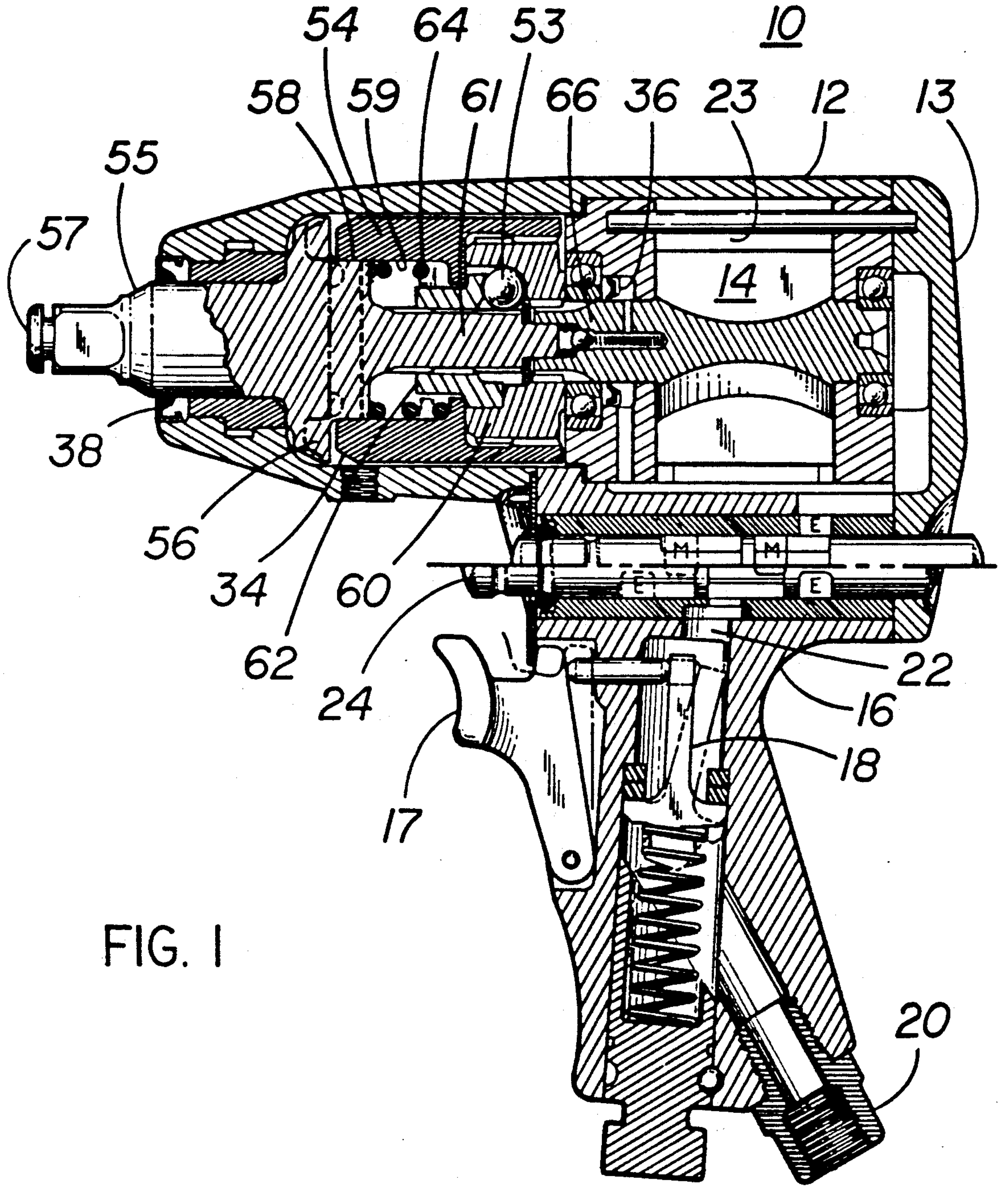
FIG. 1 is a longitudinal cross-section of an impact wrench embodying the invention.

As shown in FIG. 1 a pneumatically powered impact wrench 10 includes a housing 12 enclosing a motor unit 14 and a live air handle section 16. The live air handle section 16 includes a hand operable throttle valve 18 which is connectable by means of an inlet fitting 20 with an external source of live air. The valve 18, in response to movement of the trigger 17 controls the flow of operating air through passage 22 to the rotor chamber 23 by way of the reversing valve 24.

Figure 2:
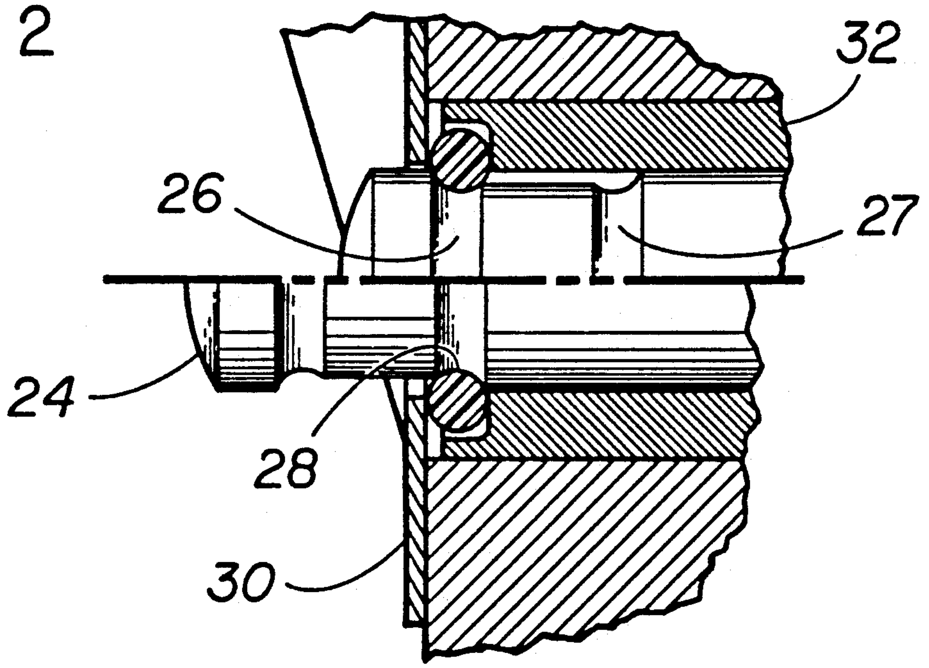
FIG. 2 is a cross-sectional view of the reverse direction valve.

The detents 26 and 27 of the reverse valve 24 make use of an "O" ring 28 as both the mechanical stop and the spring resetting device. Referring to FIGS. 1 and 2 it is seen that the "O" ring 28 is cammed in and out of the positioning grooves or detents 26 and 27 when the reverse valve 24 is horizontally displaced by the operator. The camming grooves 26 and 27 of the valve 24 cause the "O" ring 28 to stretch and remain in that position until the next groove, 26 or 27 aligns with the "O" ring and allows it to contract into the groove or detent. In this manner the position of the reverse valve 24 is maintained since the "O" ring is trapped between the exhaust deflector 30 and reverse valve bushing 32.

Whereas prior art devices use a machined and hardened pin, return spring and threaded plug, because the unit loading with the "O" ring and detent is low, the necessity for a heat treated reverse valve is eliminated.

Figure 3:
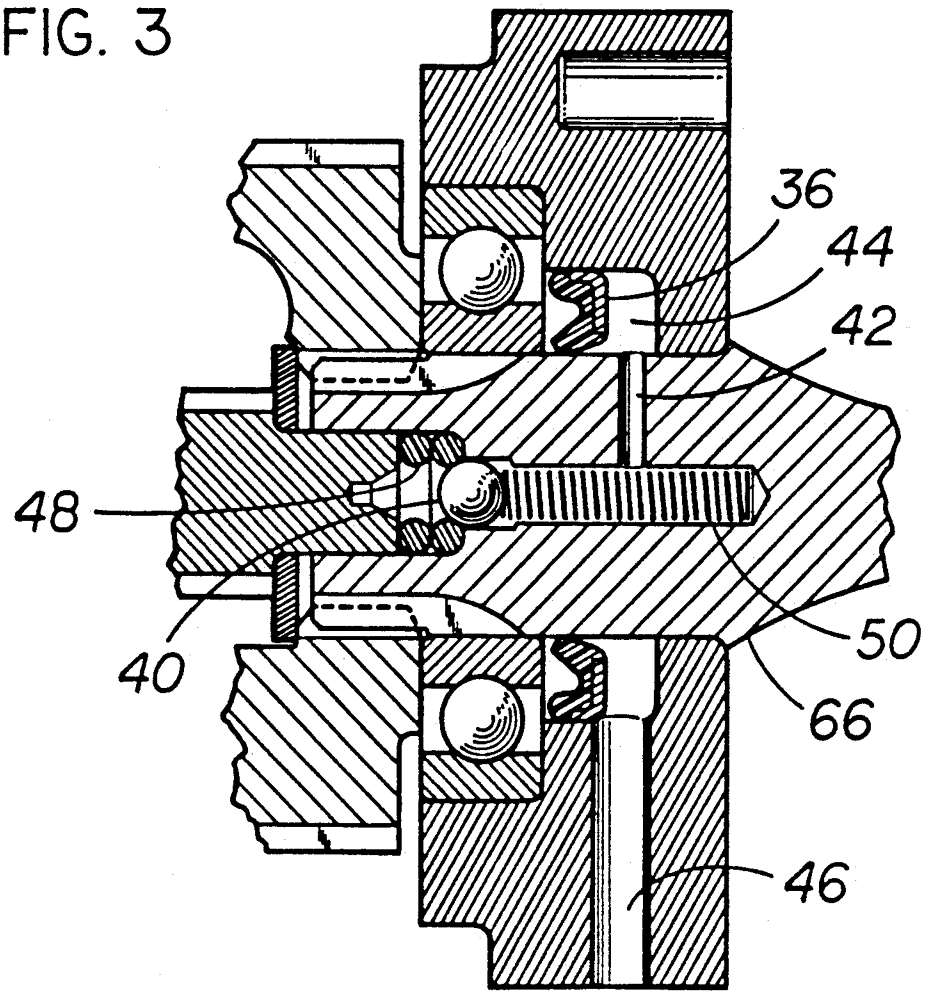
FIG. 3 is a cross-sectional view of the venting arrangement.

Continuing with the description of the preferred embodiment, and referring to FIGS. 1 and 3 an improved venting relief valve is illustrated and described. During operation high pressure air from the reversing valve 24 and rotor chamber 23 enters the clutch compartment 34 by lifting the lip of seal 36. Once in the clutch compartment 34 the air would normally be trapped because of seals 36 and 38. Without a venting system the air load on the seals 36 and 38 would cause premature wear, allowing the unwanted escape of the lubricating fluids.

In operation the vent release valve operates in the following manner. The spring side of ball valve 40 is vented to the tool exhaust system through hole 42, collector space 44 and conduit 46. The "O" rings 48 serve as the seat for the ball valve 40. The clutch compartment air pressure rises until it can unseat ball valve 40 from the "O" rings 48 thereby connecting the clutch compartment to the exhaust system. Return spring 50 returns ball valve 40 to its seat as the internal pressure decreases. This cycle may occur many times during tool operation.

As distinguished from arrangements where the vent and valve may be placed other than in the drive end of the rotor, an extended drill hole through the rotor is not necessary. The above described arrangement allows for the reduction of cost and size of the motor since the blade slots may be machined deeper into the rotor, thus permitting the same motor power in a smaller size package.

Figure 5:
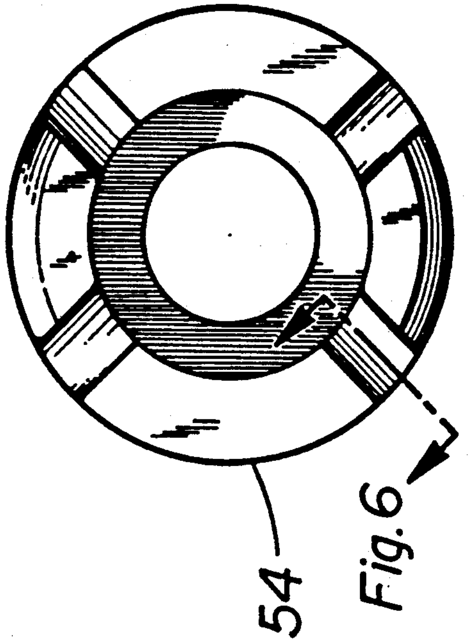
FIG. 5 is an end view of the hammer.
Figure 6:
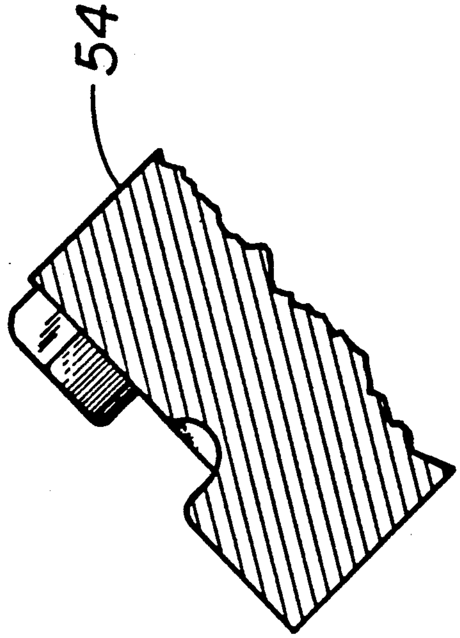
FIG. 6 is a view of FIG. 5 taken along lines 6—6.
Figure 4:
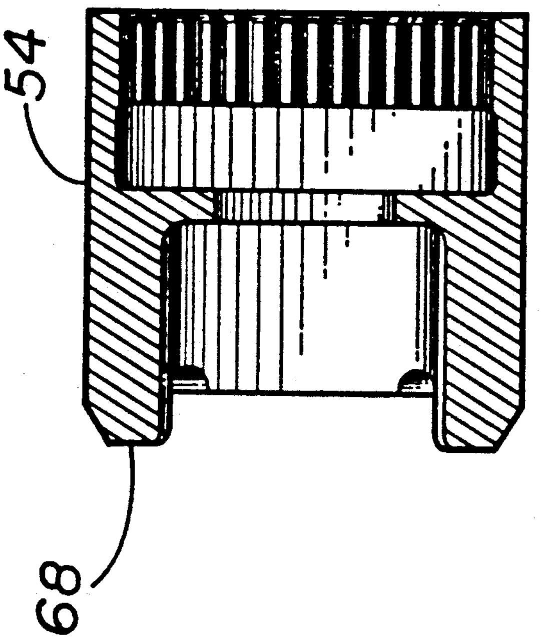
FIG. 4 is a cross-sectional view of the hammer.
Figure 7:
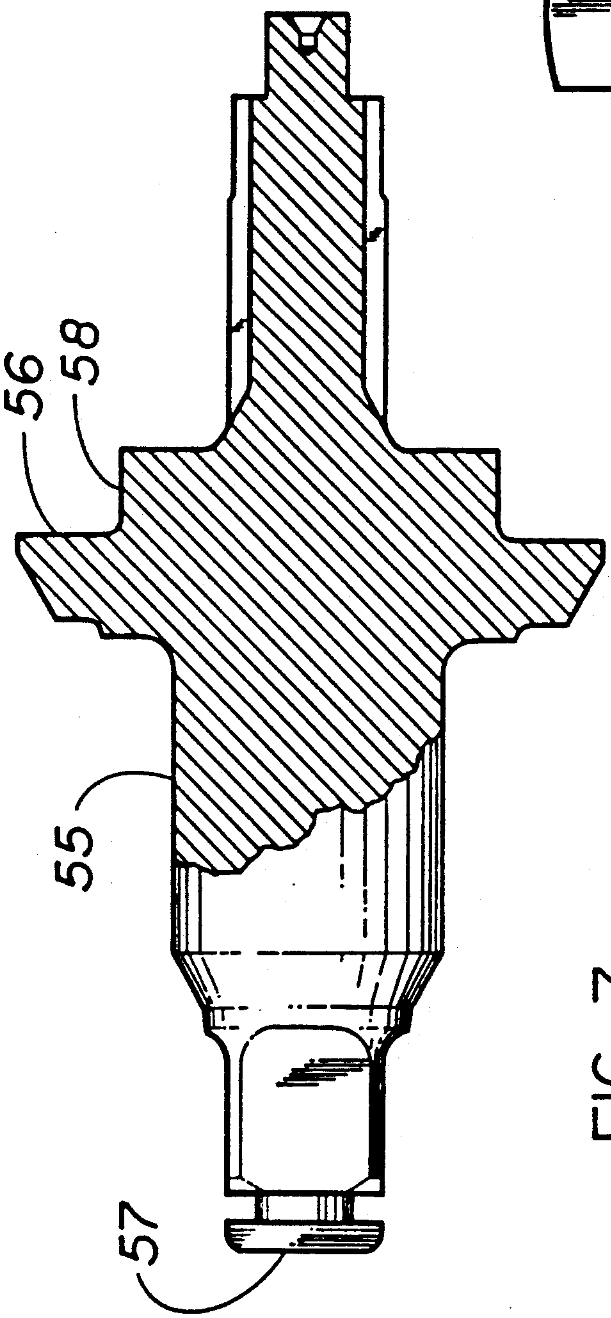
FIG. 7 is a partial cross-section view of the anvil.
Figure 8:
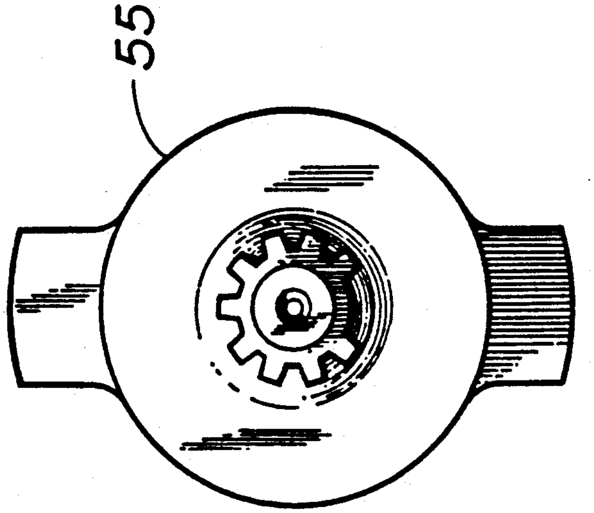
FIG. 8 is an end view of the anvil.

Continuing with the description of the preferred embodiment of the invention the following, with reference to FIGS. 1, 4 and 5, will describe an improved reversible impact wrench with improved material selection, camming, hammer and anvil construction.

The basic operation of the impact wrench 10 of the present invention was known and described in the previously noted U.S. Pat. No. 3,428,137.

The present invention comprises improvements over the previous impact wrench devices.

Specifically, referring to FIGS. 1, 4 and 5 the motor unit 14 drives a camming arrangement which laterally displaces hammer dogs 54 to rotatively impact anvil dogs 56 to rotate the anvil 55 and associated wrench socket, not shown but normally affixed to the anvil end 57.

In the improved arrangement of the present invention the camming arrangement includes at least one camming ball 53 to drive cams 60 and 62 to move hammer 54 against spring 64 to engage anvil 55.

The anvil 55 has an extension diameter or shoulder 58 that fits into the dog-hammer 54. The shoulder 58 cooperates with the inside diameter 59 of the hammer 54 to position the lugs of the dog-hammer 54 with the lugs of the anvil 55.

The direct piloting of the hammer to the anvil provides better lug position control. This arrangement makes all forces involved, in the recentering for both hammer and anvil lug contacts, act between the anvil on the dog hammer and not on the bearing supports. This arrangement increases the efficiency of energy transfer and eliminates failures of bearing supports.

In the preferred embodiment the timing shaft 61 is constructed as an integral part of the anvil 55. Inasmuch as the end of the timing shaft 61 fits, as a slip fit, into rotor 66, the anvil 55 is supported at two places, the rotor 66 and hammer 54, 59.

The moving cam 62 is connected to timing shaft 61 and not the hammer as in prior art devices.

As may be seen in FIG. 4 the hammer dog 54 has a mechanical stopping ledge 68 as part of its structure. The ledge 68 contacts against the bottom of anvil lugs 56 during impact when hammer dogs 54 moves axially to engage anvil 55 to deliver the impact blow.

This positive stop allows for the placement of return spring 64 between anvil boss 58 and bottom recess in dog 54 rather than a machined bore in the anvil 55 and separate timing shaft required by prior art devices. The present arrangement permits the anvil 55 to have an extension portion 70 to act as a pilot portion for fitting in the recessed portion of the rotor 66. This acts to guide and maintain the relative positions of the anvil and rotor.

In the preferred embodiment the motor housing 12 and back cap 13 are formed from plastic or a composite material. As distinguished from the more prevalent aluminum housing and back cap materials the composite housing material is lighter and has a lower moment of inertia value. The lower inertia housing transmits to the tool operator more of the internal loads of the clutch during the operation of the tool.

To reduce these loads to the operator rolling cams 60 and 62 are designed to furnish a constant force to accelerate the hammer dog 54 into engagement with anvil 55. Prior art devices utilize a design that produces very high initial loads to move the impacting element. These high loads, in the prior art devices are felt by the operator. Also, the energy absorbing characteristics of spring 64 matches the energy stored in dog 54 during engagement. This reduces significantly operator reaction because the energy left in the dog 54 when it contacts the mechanical stop 68 will be nil, thus transmitting little reaction to the operator.

It is understood that minor variations to the above-described apparatus may be made without departing from the spirit of the invention or the scope of the following claims.

What is claimed is:

1. A pneumatically powered impact wrench operative from an air pressure source, for tigtening fasteners and the like comprising;

handle means including a trigger and valve for manually controlling the flow of air through the said valve upon operation of the trigger, air motor means having a recessed portion axially aligned with the axis of rotor rotation, hammer means axially aligned with the said rotor and including at least two radially extending dog portions, clutch and cam means interconnecting the said air motor means and hammer means whereby axial and rotational movement is applied to the said hammer means, one piece anvil-timing means aligned with the said hammer and rotor means, the said anvil having a circular shoulder portion for fitting within and being supported by a portion of the hammer means, the said anvil also having a portion formed for mating with the said recessed portion of the rotor for support thereby, the said anvil having dogs for receiving impacts from the said hammer dogs when the hammer moves axially and rotatively, to thereby impart rotative motion to the said anvil.

2. The apparatus of claim 1 further comprising plastic housing means surrounding the said motor, clutch, cam, hammer and anvil means within the housing in an essentially air tight condition.

3. A pneumatically powered impact wrench operative from an air pressure source, for tightening fasteners and the like comprising;

handle means including a trigger and valve for manually controlling the flow of air through the said valve upon operation of the trigger, manually operable circular reverse direction valve means for controlling the direction of air in one of two manually selected means, the valve means including at least two parallel detents formed in the periphery of the said circular valve means, and at least one "O" ring selectively movable from one of the said detents to the other to selectively hold the valve reversing means in one of the possible positions dictated by the detents, and air motor means including a rotor rotatable in a direction selected by the said reverse valve means.

4. A pneumatically powered impact wrench operative from an air pressure source, for tightening fasteners and the like comprising;

handle means including a trigger and valve for manually controlling the flow of air through the said valve upon operation of the trigger, air motor means including a rotor, hammer means, cam means, anvil means aligned with said hammer and rotor means, housing means surrounding the said motor, clutch, cam, hammer and anvil means to retain the various means within the housing in an essentially air tight condition, and venting means including a spring-loaded ball valve and O-ring retaining means to permit excessive air pressure to escape from the said housing.

5. A pneumatically powered impact wrench operative from an air pressure source, for tightening fasteners and the like comprising;

handle means including a trigger and valve for manually controlling the flow of air through the said valve upon operation of the trigger, manually operable circular reverse direction valve means for controlling the direction of air in one of two manually selected means, the valve means including at least two parallel detents formed in the periphery of the said circular valve means, and at least one "O" ring selectively movable from one of the said detents to the other to selectively hold the valve reversing means in one of the possible positions dictated by the detents, air motor means including a rotor rotatable in a direction selected by the said reverse valve means, the rotor having a recessed portion axially aligned with the axis of rotor rotation, hammer means axially aligned with the said rotor and including at least two radially extending dog portions, clutch and cam means interconnecting the said air motor means and hammer means whereby axial and rotational movement is applied to the said hammer means, one piece anvil-timing means aligned with the said hammer and rotor means, the said anvil having a circular shoulder portion for fitting within and being supported by a portion of the hammer means, the said anvil also having a portion formed for mating with the said recessed portion of the rotor for support thereby, the said anvil having dogs for receiving impacts from the said hammer dogs when the hammer moves axially and rotatively, to thereby impart rotative motion to the said anvil, plastic housing means surrounding the said motor, clutch, cam, hammer and anvil means to retain the various means within the housing in an essentially air tight condition, and venting means including a spring-loaded ball valve and O-ring retaining means to permit excessive air pressure to escape from the said housing.

* * * * *